March 2, 1971  F. S. ROSTLER  3,567,475
ASPHALT SOLUTIONS AND METHODS FOR APPLYING THE SAME
Filed Aug. 26, 1966  2 Sheets-Sheet 1

FRITZ S. ROSTLER
INVENTOR
KENDRICK, SUBKOW and STOLZY
BY
ATTORNEYS

United States Patent Office 3,567,475
Patented Mar. 2, 1971

3,567,475
ASPHALT SOLUTIONS AND METHODS FOR APPLYING THE SAME
Fritz S. Rostler, Berkeley, Calif., assignor to Witco Chemical Company, Inc., New York, N.Y.
Continuation-in-part of application Ser. No. 366,574, May 11, 1964, which is a continuation-in-part of application Ser. No. 274,193, Apr. 19, 1963, now Patent No. 3,162,101, and also is a continuation-in part of applications Ser. No. 366,568, May 11, 1964, which is a division of application Ser. No. 274,193, Apr. 19, 1963, which in turn is a continuation-in-part of abandoned applications Ser. No. 45,023, July 25, 1960, and Ser. No. 254,399, Jan. 28, 1963, which also in turn are continuations-in-part of abandoned application Ser. No. 497,397, Mar. 28, 1955. This application Aug. 26, 1966, Ser. No. 575,466
Int. Cl. C08h 13/00, 17/22
U.S. Cl. 106—278                                16 Claims

ABSTRACT OF THE DISCLOSURE

An asphalt solution for treating uncemented sands, soils and aggregates to consolidate the same, which solution contains a light petroleum oil fraction having a boiling point lower than that of light gas oil and from 10–80% by weight of a gel type asphalt. The gel type asphalt has an R ratio of about 0.8 to about 1.2 and has a penetration of 60–100 at 77° F. (ASTM D–5). The asphalt solution contains a cationic surfactant and the solution has a 95% minimum coating retention as tested by ASTM test D–1664. The method of treating bodies of uncemented sand, soils and aggregates to consolidate them, which method involves applying to the surface of the bodies an asphalt solution as defined above.

Figure 1:
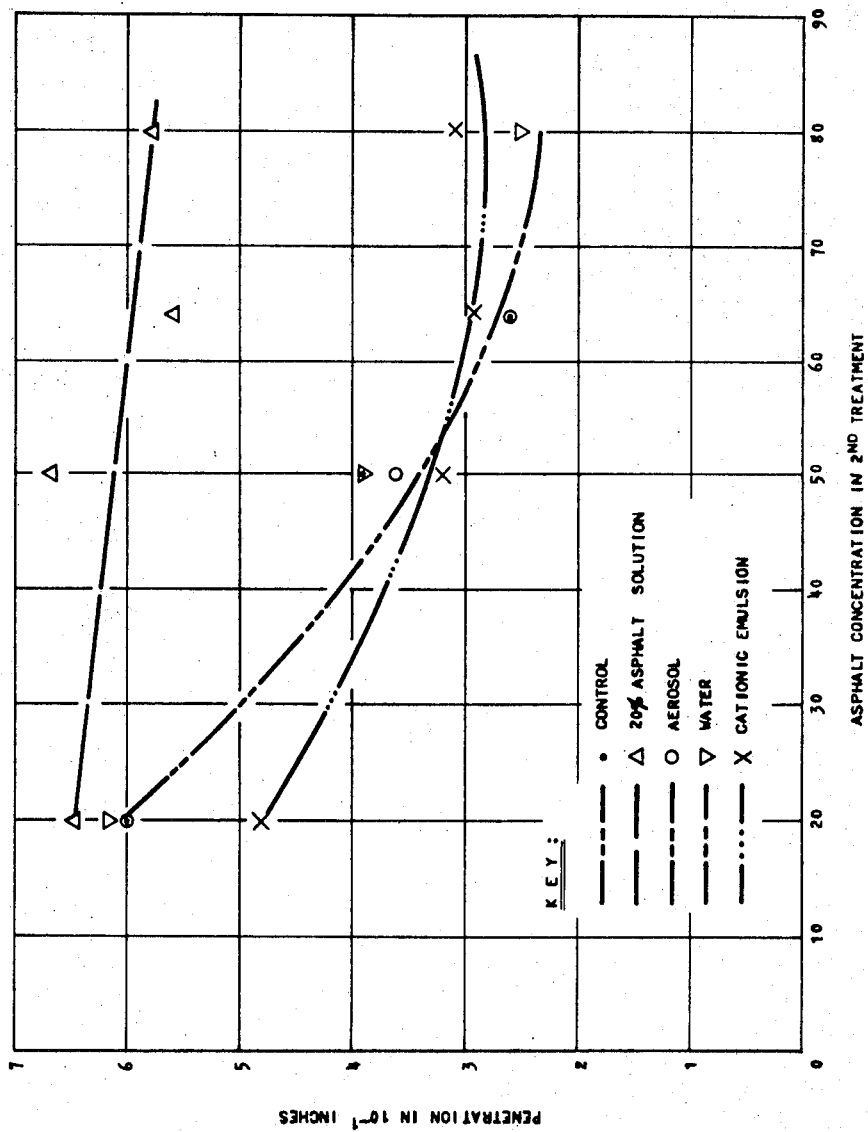

The method of treating bodies of uncemented sands, soils and aggregates to consolidate them. First, there is applied to the surface a solution of a light petroleum oil fraction having a boiling point lower than that of light gas oil and containing from 10 to 30% by weight of a gel type asphalt having a penetration of 60–100 at 77° F. (ASTM D–5), an R ratio of from about 0.8 to about 1.2, and containing a cationic surfactant. The solution has a 95% minimum coating retention as tested by ASTM test D–1664 at a rate of application of about 0.2 to about 1 gallon per square yard of surface being treated. Following the first treatment, there is applied to the surface a light petroleum oil (as defined above) solution containing 50–70% by weight of a gel type asphalt having a penetration of 60–100 at 77° F. (ASTM D–5), an R ratio of from about 0.8 to about 1.2 and containing a cationic surfactant. The asphalt solution has a 95% minimum coating retention as measured by ASTM test D–1664, and the second application is made at a rate of from about 0.5 to about 2 gallons per square yard of the surface being treated.

This invention relates to a method for treating unpaved roads, soils, earth and earthen structures.

This application is a continuation-in-part of application Ser. No. 366,574, May 11, 1964, which is a continuation-in-part of application Ser. No. 274,193, filed Apr. 19, 1963, now Pat. 3,162,101; and it is also a continuation-in-part of application Ser. No. 366,568, filed May 11, 1964 (now United States Pat. 3,432,321), which is a division of said application Ser. No. 274,193. Said application Ser. No. 274,193 is in turn a continuation-in-part of application Ser. No. 254,399, filed Jan. 28, 1963, now abandoned, and application Ser. No. 45,023, filed July 25, 1960, now abandoned, which in turn was a continuation-in-part of application Ser. No. 497,397, filed Mar. 28, 1955, now abandoned.

It has been known to convert soils and aggregates such as sand and gravel into asphaltic concretes and structures such as roads, pavements and other structures by mixing a liquified asphalt with the sand, gravel, soils and other aggregates. An asphalt, which has been liquified by heat, is mixed with the aggregate material while the asphalt is hot and the mixture allowed to set by cooling into a structure in which the aggregate is bonded by the solidified asphalt.

It has been shown by the applicant that such a procedure causes severe deterioration of the asphalt. See ASTM Special Publication No. 277 referred to in said Pat. 3,162,-101, col. 5, lines 51 to 58.

By applying the asphalt to soils and other aggregates as an asphalt solution, i.e., one mixed with volatile solvents such as kerosene or naphtha such deterioration may be avoided.

It has been the practice in applying cut-back asphalt to uncemented sand, soils, roads, earth structures and other aggregate structures which are not bonded by asphalt, such as soils and dirt roads, herein referred to as uncemented, to wet the surface in order to lay the dust prior to application of the cut-back asphalt. I have now found that the practice of wetting the earth, dirt road or aggregate structure and applying a cut-back asphalt or any type of asphalt solutions to a wet aggregate structure reduces the penetration of the asphalt into the structure and thus reduces the bonding effect.

I have found that improved penetration of asphalt solutions is obtained when the surface and the subsurface of the structure to be reached by the asphalt are dry.

I have found that further improved results are obtained if the solution is applied in at least two treatments with a solution of higher asphaltic concentration in the second treatment.

In order to obtain the superior results I have found that the asphalt employed should have specific properties coming within defined ranges. In Pat. 3,162,101 applicant has shown that asphalts depending upon the penetration grade having an R ratio defined as the ratio of $$\frac{N+A_1}{P+A_2}$$

should preferably be in a range of 0.4 to about 1.5, particularly when the asphalt is in the 85 to 100 grade.

The symbols $N$, $A_1$, $P$ and $A_2$ are the components of the pentane soluble fraction of the asphalt and are identified in said Pat. 3,162,101 at col. 1, line 53, to col. 2, line 17. The term asphalt as herein employed is that defined in said patent at col. 1, lines 26 to 52. The above patent and the above designations are herewith incorporated by this reference. Symbols N, $A_1$, $A_2$ and P, identify respectively the percent by weight of the nitrogen bases, the first acidaffins, the second acidaffins, and the paraffins which are present in the pentane soluble fraction of the asphalt.

I have now found that by using such asphalts in solution for application to uncemented earth structures described above, the asphalt should preferably be a gel type asphalt having a penetration in the range of 60 to 100 at 77° F. (ASTM method D–5) and have an R ratio in the range of about 0.8 to 1.2. The asphalt should preferably be such as to produce a residual asphalt after distillation at 680° F. pot temperature by ASTM method D–402, of about 150 to 250 penetration.

The above asphalt should be dissolved in a solvent such as kerosene, naphtha or an equivalent volatile solvent in concentrations ranging from about 10% to about 90% of the asphalt and 90% to 10% of the solvent by weight. To this asphalt solution I prefer to add a cationic surfactant. The surfactant may be used in the range of 0.1 to about 2% and preferably in the range of 0.4% to 2%, for example .5% by weight of the asphalt solution.

EXAMPLE I

The following data shows the effect of pretreatment with water of the surface of consolidated sand, when followed by treatment with an asphalt solution according to this invention. Molded briquettes 2 inches in diameter, 1½ inches high with a 1.128 inches diameter and .25 inch deep reservoir pressed into the top were made by compacting silty sand with a moisture content for optimum compaction, for one minute with a force 600 lbs. per square inch. The silty sand used was class SM soil as designated in the Unified Soil Classification. It had the following particle size distribution:

Percent passing No. 4 mesh screen—100
Percent passing No. 16 mesh screen—99
Percent passing No. 50 mesh screen—98
Percent passing No. 100 mesh screen—87
Percent passing No. 200 mesh screen—29
Percent passing No. 270 mesh screen—17
Percent finer than 1 micron—5

The briquettes were allowed to air dry before subjecting them to tests to be described below.

Twenty briquettes were first treated by various pretreatment techniques and successively with a 20, 50, 64 and 80% solution of an asphalt in kerosene. The asphalt was produced by air blowing an asphalt having a penetration of about 85–100 at 77° F. (ASTM D–5) to reduce the penetration to about 20–25 penertation. This asphalt was mixed with a lubricating oil raffinate to produce an asphalt of 95 penertation at 77° (ASTM D–5) with an R ratio of 0.9. The kerosene employed had a specific gravity of 0.84 at 60/60° F. with a distillation range at 760 mm. mercury as follows:

Initial boiling point at 320° F., 10% at 367° F.; 50% at 396° F.; 90% at 433° F. The solutions contained 0.5% of the surfactant Emeen 6680 identified below.

The asphalt solution can be defined as a medium cure asphalt, i.e., an MC type. The results are given in the following table:

Four of the briquettes without any further treatment were treated with the above solutions containing 20%, 50%, 64% and 80% by weight of the above asphalt by weight. The amount added into the reservoir was sufficient to equal 1 gallon of the solution per square yard of cross-sectional surface of the briquettes. The control did not have any prior treatment. Four more sets of briquettes were treated with the above quantities of asphalt solutions after having been previously treated with water, a cationic emulsion same as Product 2 in Table X of Pat. 3,162,101 diluted to 10% solids, 2.5% aqueous solution of Aerosol OT anionic surfactant (an ester of a sulfonated bicarboxylic acid) and the 20% asphalt solution as identified above. The amount of liquid employed in the pretreatment was 0.5 gal. per square yard of cross-sectional area of the briquette. The briquettes were allowed to stand for 12 hours before being subjected to the second treatment.

In the second treatment, the elapsed time required for the complete penetration of the quantity of the asphalt solution applied to the briquette in the second treatment was noted. The briquettes were allowed to stand 24 hours and then split on their diametric plane, and the depth to which the asphalt had penetrated was noted.

TABLE 1

| Briquet pretreatment at 0.5 gal./sq. yd. | Briquet 2nd treatment at 1 gal./sq. yd. | | | |
| --- | --- | --- | --- | --- |
| | 20% | 50% | 64% | 80% |
| Control: | | | | |
| Rate | 6 sec | 71 sec | 675 sec | >24 hr. |
| Depth | 0.60 in | 0.39 in | 0.26 in | |
| Water: | | | | |
| Rate | 6 sec | 87 sec | 949 sec | 12 hr. |
| Depth | 0.62 in | 0.39 in | 0.29 in | 0.25 in. |
| Cationic emulsion 10%: | | | | |
| Rate | 6 sec | 85 sec | 905 sec | 12 hr. |
| Depth | 0.48 in | 0.32 in | 0.29 in | 0.31 in. |
| Aerosol 2.5%: | | | | |
| Rate | 9 sec | 147 sec | 1,459 sec | >24 hr. |
| Depth | 0.60 in | 0.36 in | 0.26 in | |
| Asphalt solution 20%: | | | | |
| Rate | 6 sec | 77 sec | 637 sec | 5 hr. |
| Depth | 0.65 in | 0.67 in | 0.56 in | 0.58 in. |

The data are plotted in FIG. 1.

It will be seen that the aqueous pretreatment, whether it was water or water containing a wetting agent or an emulsion, gave no improved penetration as compared to the control for all concentrations in the second treatment.

In fact, with the 20% asphalt solution pretreatment the penetration for all of the second treats was maintained substantially uniform, whereas for the aqueous pretreats, the penetration fell drastically as the solutions became more concentrated.

Since the higher concentration solutions introduce more asphalt into the structure, the aqueous pretreat limits the amount of asphalt which can be introduced. The asphalt solution pretreat, however, permits the introduction of a larger quantity of asphalt by using higher concentrations of asphalt without impairing the penetration. This results in improved bonding where the lower concentrations do not introduce sufficient bonding agent.

The effect of the aqueous pretreat on the rate of penetration of the asphalt can be seen by comparing the time necessary to absorb all of the material applied. Table 2 gives the ratios of the times required to absorb all of the applied materials in the second treatment (stated in Table 1) compared to the time for the control.

| Pretreat | 2nd treat | | |
| --- | --- | --- | --- |
| | 20% | 50% | 64% |
| Control | 1 | 1 | 1 |
| Water | 1 | 1.23 | 1.41 |
| Cationic emulsion | 1 | 1.2 | 1.34 |
| Aerosol OT solution | 1.5 | 2.08 | 2.16 |
| 20% asphalt solution | 1 | 1.08 | 0.95 |

It will be seen that for the 20% asphalt solution application as the second treat there is no improvement over the control for the water alone or the emulsion or the 20% asphalt solution pretreatment. The aerosol OT solutions, that is water containing a wetting agent, materially reduced the penetration of the second 20% solution application. However, with the higher concentrations of 50% and 60% asphalt second treats, the aqueous pretreats especially the aerosol solution materially reduced the penetration rate as compared with the control while the asphalt solution pretreat did not delteriously affect the penetration rate.

The above data also show the advantage in depth of penetration without impairment of the rate of penetration by using the low concentration asphalt solution pretreat followed by higher concentration second treat as compared to a single application.

EXAMPLE II

This example illustrates the effect of the concentration of the solution employed in the pretreatment of the briquette on the penetration of solutions of various concentrations prepared as stated in Example I.

In carrying out this test, briquettes were prepared as in Example I except that a thin layer of powdered kaolin was placed in the depression.

They were groups in 9 groups and except for group 1 used as the control, which received no pretreatment, the groups were treated with solutions prepared as in Example 1 using 0, 10, 20, 40, 50, 60, 64 and 70% of the above asphalt in the above kerosene. The groups 2–9 were treated with the asphalt solution as shown in the column marked pretreatment with the solution used in amounts equivalent to 0.5 gal. per square yard of cross-sectional area of the briquette. Within 24 hours after application of the pretreatment the briquettes of each group were treated with the solutions as shown in the table using an amount of solution equivalent to 1 gallon per square yard of cross-sectional area of the briquette. The time required for the amount to penetrate was recorded. When the material was completely absorbed, the briquettes were allowed to stand for 24 hours. The briquettes were then cut on a diametric plane and the depth of penetration of the asphale was observed.

this range of 40 to 70% of asphalt content. The penetration with an asphalt solution of 70% asphalt is less than for a solution of 40 to 64%. Since it is desirable to use as high a concentration as permissible keeping the depth of penetration in mind, I prefer to employ for the second treatment a solution of 64% concentration following a pretreatment with 20% asphalt concentration.

This data shows that the greatest penetration will be obtained using a pretreat in the range of 10–30% and a subsequent treat in the range of 40% or higher, for example 60–70%.

Field tests have confirmed the advantages of the solutions designed as above in actual application to uncemented roads for purposes of introducing asphalt to bind the dirt and aggregate particles.

For more effective use I thus prefer to employ in the asphalt solutions to be used in the process of consolidation of soils, sands and other aggregates as stated above, asphalts having the following characteristics:

(1) An asphalt having gel, i.e., non-Newtonian viscosity characteristics.

The asphalt should have an R ratio of from 0.8 to 1.2 and a penetration (at 77° F. ASTM D–5) of paving penetration, i.e., from about 40 to about 150, preferably 60 to 100 penetration.

Such asphalts are suitably prepared by blending an asphalt of R ratio substantially higher than that desired to be used, and of substantially lower penetration with either an asphalt, of lower R ratio and higher penetra-

TABLE 3

| Group | Pretreatment | Concentration of solution employed in subsequent treatment at 1 gal./sq. yd. | | | | | |
|---|---|---|---|---|---|---|---|
| | | 20% | 40% | 50% | 60% | 64% | 70% |
| 1 | Control: | | | | | | |
| | Rate | 6 sec | | 71 sec | 6 min | 14 min | 50 min. |
| | Depth | 0.60 in | | 0.39 in | 0.30 in | 0.26 in | 0.21 in. |
| 2 | Kerosene (0% asphalt): | | | | | | |
| | Rate | 6 sec | 35 sec | 81 sec | 7 min | 12 min | 40 min. |
| | Depth | 0.87 in | 0.67 in | 0.65 in | 0.55 in | 0.50 in | 0.44 in. |
| 3 | 10% asphalt solution: | | | | | | |
| | Rate | 6 sec | 29 sec | 82 sec | 7 min | 12 min | 39 min. |
| | Depth | 0.84 in | 0.77 in | 0.68 in | 0.63 in | 0.57 in | 0.53 in. |
| 4 | 20% asphalt solution: | | | | | | |
| | Rate | 6 sec | 31 sec | 72 sec | 12 min | 21 min | 66 min. |
| | Depth | 0.76 in | 0.87 in | 0.68 in | 0.70 in | 0.67 in | 0.61 in. |
| 5 | 40% asphalt solution: | | | | | | |
| | Rate | | | 95 sec | 19 min | 29 min | 60 min. |
| | Depth | | | 0.57 in | 0.56 in | 0.54 in | 0.53 in. |
| 6 | 50% asphalt solution: | | | | | | |
| | Rate | | | 131 sec | 14 min | 34 min | 108 min. |
| | Depth | | | 0.51 in | 0.46 in | 0.44 in | 0.41 in. |
| 7 | 60% asphalt solution: | | | | | | |
| | Rate | 20 sec | 110 sec | 321 sec | | | |
| | Depth | 0.51 in | 0.33 in | 0.34 in | | | |
| 8 | 64% asphalt solution: | | | | | | |
| | Rate | 46 sec | 126 sec | 390 sec | | | |
| | Depth | 0.60 in | 0.28 in | 0.33 in | | | |
| 9 | 70% asphalt solution: | | | | | | |
| | Rate | 182 sec | 376 sec | 1,260 sec | | | |
| | Depth | 0.35 in | 0.33 in | 0.31 in | | | |

Figure 2:
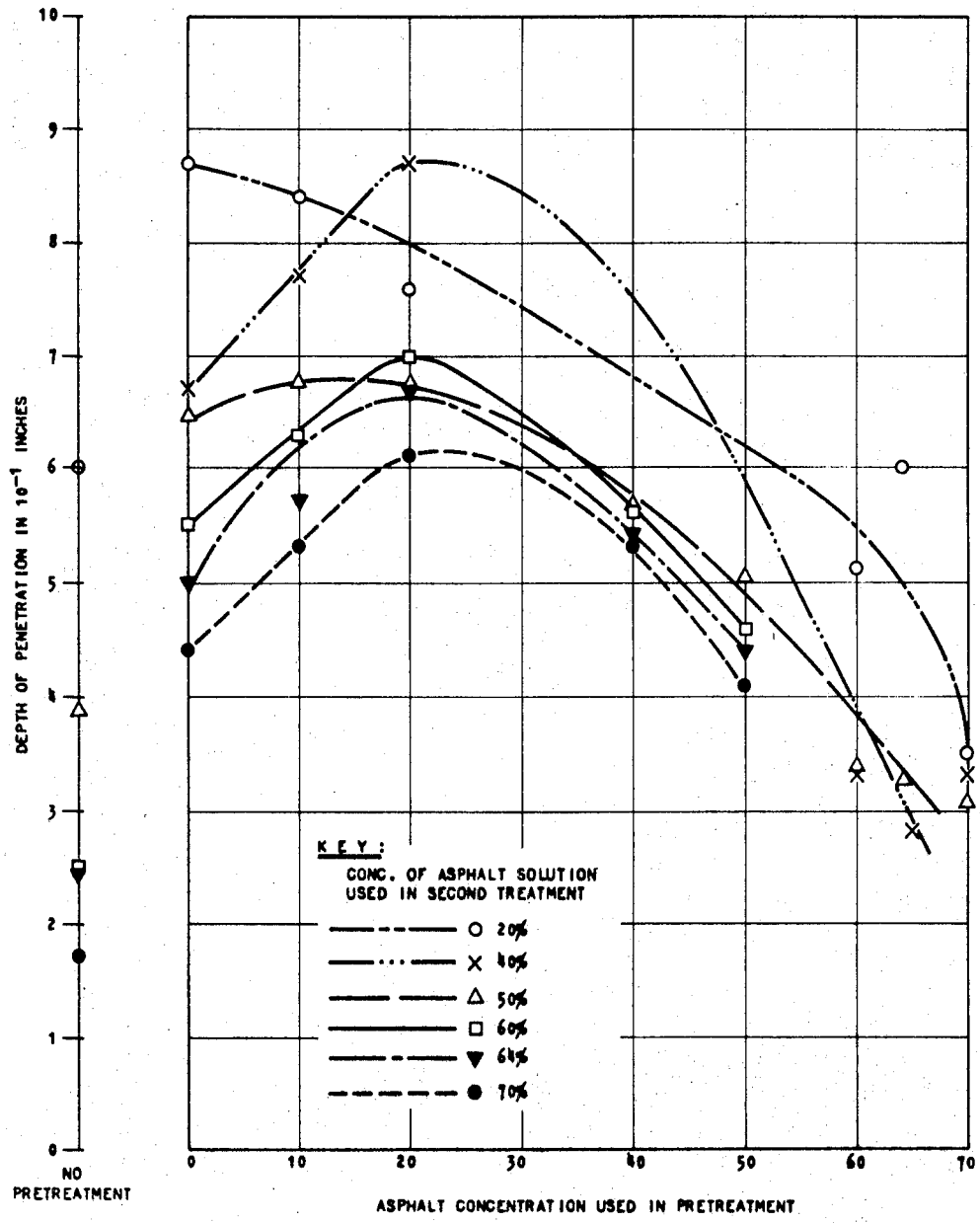

The effect of the asphalt concentration of the solution used in the pretreatment on the depth of penetration of solutions of different concentrations employed in the second treatment is shown in FIG. 2, which plots the data of Table 3.

It will be seen that employing a solution in the range of about 10–30% one may obtain the optimum penetration for each asphalt concentration used in the second treatment, and that in such combinations the asphalt concentration employed in the subsequent treatment is preferably above 40% or higher.

The preferred concentrations for the second treat are in tion in proportions to produce the asphalt stated above, or with an oil of lower R ratio.

The production of such asphalts by the above means and the nature of the asphalts and oils employed in making the blends and the weight ratios to be employed in making the blends are fully described in my above Pat. No. 3,162,101, to which reference may be had, and which is incorporated herein by this reference.

The lower penetration asphalts used to produce the asphalt solutions include the roofing grade asphalts of from 10 to 30 penetration at 77° F. (ASTM D–5) for example such as to meet ASTM specifications 312–A, 312-B, 312-C for roofing asphalt. A suitable, low penetration asphalt is for instance one meeting the following specifications:

| Specifications | Minimum | Maximum |
| --- | --- | --- |
| Softening point, °F | 140 | 145 |
| Penetration at 32° F | 5 | 9 |
| Penetration at 77° F | 18 | 24 |
| Penetration at 115° F | 90 | 180 |
| Ductility at 77° F | 100 | |
| Solubility CCl$_4$, percent | 99.5 | |
| Loss on heating, percent | | 0.5 |
| P.A.L. percent of original | 75 | |
| Specific gravity | 1.02 | |
| Viscosity at 325° F.S.S.F. | | 200 |
| Flash (C.O.C.)° F | 500 | |
| Insoluble in n-pentane, percent | | 30 |
| Panel flow test, inches | 1 | 9 |
| Penetration index | 5 | |
| Oliensis spot test | Negative | |

Preferably, I produce the asphalt to be used as asphalt solution by blending an oxidized asphalt of 10-40 penetration (77° F. ASTM D-5) with a suitable oil or higher penetration asphalt. The hard asphalt is blended with an oil, substantially free of asphaltenes and of lower R ratio in amounts to bring the R ratio of the blended asphalt to the desired value and the consistency to paving grade penetration. A preferred oil is one which has relatively high boiling petroleum fractions and is substantially free of fractions boiling below about 160° C. at 10 mm. Hg pressure. It preferably should have a distillation range whose initial value is about 200° C. at 10 mm. Hg absolute pressure (ASTM test D-1160).

This asphalt is dissolved in a volatile solvent of a petroleum fraction for example of the naphtha or kerosene grade. Preferably, it should have an initial boiling point higher than that of gasoline. It should have an end point less than that of light gas oil. For example, a suitable solvent had an initial boiling point in the range of 300 to 350° F. and 90% distilled below 450° F. all at 760 mm. Hg. The kerosene referred to in Example 1 is a suitable solvent.

The asphalt is dissolved in the solvent to give a solution of asphalt with a concentration of from 20% to 80% by weight, i.e., 2 parts by weight of the asphalt to 8 parts by weight of the solvent up to 8 parts by weight of the asphalt to 2 parts by weight of the solvent. The cationic surfactant used in the amounts specified above is introduced.

Illustrative examples of suitable surfactants are cetyl pyridinium chloride, or other quaternary ammonium salts, aliphatic fatty amines and their derivatives, the homologues of the aromatic amines having fatty chains, fatty quaternary ammonium salts, amino-amido-amines or the salts thereof, for example the amine Emeen 6670 and its acetate, Emeen 6680 or the propionate sold by Emery Industries or their chlorides. The alkane amino propyl amine chlorides may also be used. The above cationic surfactants are employed in amounts sufficient to pass the stripping test (95% minimum retention of coating) described in ASTM method D-1664, or the stripping test described in Bitumen in Hydraulic Engineering by Baron W. F. Van Asbeck, Elsevier Publishing Company, 1964, vol. 2, pp. 277-278.

The solution is applied by spraying it onto the dry earth or aggregate. For example, a dirt road or more extensive dirt surfaces, such as a parking or play ground area, are levelled and let air dry, if it has been rained on. The dry surface is sprayed with the solution.

If a single application of the solution is to be made, a 50-70% concentration is used in amount of from ¾ to 1.5 gallons per square yard of surface, for example 60-64% at 1 gallon per square yard.

I prefer, however, that the solutions be applied in two applications. The first application of the dry soil or aggregate surface should be a solution of 20-30% of concentration, 0.2 to 1 gallon per square yard, usually 0.5 gallon per square yard of surface.

After allowing the surface to stand to permit the solution to penetrate a second application of concentration 60-70% for example 64% is made in amounts of about 0.5 to 2 gallons per square yard, for example 1.5 gallons per square yard.

The following illustrates the advantages of the asphalt solutions of my invention and the method of consolidation of soil, sand and aggregate employing said solutions as stated in Example I. In each case the area to which the solution had been applied had the appearance, texture and quality of a road mixed surface. The surface were prepared by wetting, a rolling and shaping. The surfaces were allowed to dry before applying the asphalt solution containing 64% asphalt.

EXAMPLE III

The area treated, a road base of decomposed granite 600 feet long and 24 feet wide, was treated with the above described solution at the rate of 0.8 gallon per square yard. The penetration was 1 inch deep. This road was in excellent condition after 6 months' use. A control strip treated with a medium cure cut-back (MC-70), which did not contain the specified asphalt or the cationic surfactant failed in 4 days.

A road 1900 feet long and 12 feet wide was treated with various quantities of the solution containing 64% asphalt as above. To 600 feet of the road the solution was applied at the rate of 0.4 gallon per square yard, to 700 feet at the rate of 0.5 gallon per square yard, and to 600 feet at the rate of 0.6 gallon per square yard. The soil was a sandy desert soil. The depth of penetration was from 0.5 to 0.75 inch. The surface produced was satisfactory, but for this soil a further improvement is believed possible by using more than 0.6 gallon per square yard, for example 0.8 to 1½ gallons per square yard for surfaces of this nature.

The asphalt solution in each of the above cases was prepared as described in Example I and contained 64% of the asphalt.

While I have described particular embodiments of my invention for the purpose of illustration, it should be understood that various modifications and adaptations thereof may be made within the spirit of the invention, as set forth in the appended claims.

I claim:

1. An asphalt solution for treating uncemented sands, soils and aggregates to consolidate the same, said solution consisting essentially of a light petroleum oil fraction having a boiling point lower than that of light gas oil and from 10 to 80 percent by weight of a gel type asphalt, said gel type asphalt having a penetration of 60–100 at 77° F. (ASTM D-5) and having an R ratio of from about 0.8 to about 1.2, the R ratio being equal to the ratio $$\frac{N+A_1}{P+A_2}$$

wherein N, $A_1$, $A_2$ and P are respectively the percent by weight of nitrogen bases, first acidaffins, second acidaffins and paraffins present in said asphalt, said solution containing a cationic surfactant, and said solution having a 95 percent minimum coating retention as tested by ASTM test D-1664.

2. The asphalt solution of claim 1 in which said asphalt is a blend of a roofing grade asphalt having from about 10 to about 30 penetration at 77° F. (ASTM D-5) and a petroleum fraction substantially free from asphaltenes and having a boiling point substantially higher than that of said light petroleum fraction.

3. The asphalt solution of claim 1, in which said light petroleum oil fraction has an initial boiling point of 300–350° F. and 90% distilled below 450° F. at 760 mm. Hg pressure.

4. The asphalt solution of claim 2, in which said light petroleum oil fraction has a boiling point of 300–350° F. and 90% distilled below 450° F. at 760 mm. Hg pressure and said petroleum fraction substantially free of asphaltenes is substantially free of fractions boiling below about 160° C. at 10 mm. Hg pressure when tested by the ASTM test D-1160.

5. A method of treating bodies of uncemented sands, soils and aggregates to consolidate the same, which comprises applying to the surface of said bodies a solution consisting essentially of a light petroleum oil fraction having a boiling point lower than that of light gas oil and from 10 to 80 percent by weight of a gel type asphalt, said gel type asphalt having a penetration of 60–100 at 77° F. (ASTM D–5) and having an R ratio from about 0.8 to about 1.2, the R ratio being equal to the ratio $$\frac{N+A_1}{P+A_2}$$

wherein N, $A_1$, $A_2$ and P are respectively the percent by weight of nitrogen bases, first acidaffins, second acidaffins and paraffins present in said asphalt, said solution containing a cationic surfactant, and said solution having a 95 percent minimum coating retention as tested by ASTM method D–1664 at the rate of from 0.2 to 2 gallons per square yard of said surface.

6. The method of claim 5, in which said asphalt is a blend of a roofing grade asphalt having from about 10 to about 30 penetration at 77° F. (ASTM D–5) and a petroleum fraction substantially free from asphaltenes and having a boiling point substantially higher than that of said light petroleum fraction.

7. The method of claim 5, in which said light petroleum oil fraction has an initial boiling point of 300–350° F. and 90% distilled below 450° F. at 760 mm. Hg pressure.

8. The method of claim 6, in which said light petroleum oil fraction has a boiling point of 400–450° F. and 90% distilled below 450° F. at 760 mm. Hg pressure and said petroleum fraction substantially free of asphaltenes is substantially free of fractions boiling below about 160° C. at 10 mm. Hg pressure when tested by the ASTM test D-1160.

9. A method of treating bodies of uncemented sands, soils and aggregates to consolidate the same, which comprises applying to the surface of said bodies a solution consisting essentially of a light petroleum oil fraction having a boiling point lower than that of light gas oil and from 50 to 70 percent by weight of a gel type asphalt, said gel type asphalt having a penetration of 60–100 at 77° F. (ASTM D–5) and having an R ratio of from about 0.8 to about 1.2, the R ratio being equal to the ratio $$\frac{N+A_1}{P+A_2}$$

wherein N, $A_1$, $A_2$ and P are respectively the percent by weight of nitrogen bases, first acidaffins, second acidaffins and paraffins present in said asphalt, said solution containing a cathionic surfactant, and said solution having a 95 percent minimum coating retention as tested by ASTM test D–1664 at the rate of about 0.75 to about 1.5 gallons per square yard of said surface.

10. The method of claim 9, in which said asphalt is a blend of a roofing grade asphalt having from about 10 to about 30 penetration at 77° F. (ASTM D–5) and a petroleum fraction substantially free of asphaltenes and having a boiling point substantially higher than that of said light petroleum fraction.

11. The method of claim 9, in which said light petroleum oil fraction has an initial boiling point of 300–350° F. and 90% distilled below 450° F. at 760 mm. Hg pressure.

12. The method of claim 10, in which said light petroleum oil fraction has a boiling point of 300–350° F. and 90% distilled below 450° F. at 760 mm. Hg pressure and said petroleum fraction substantially free of asphaltenes is substantially free of fractions boiling below about 160° C. at 10 mm. Hg pressure when tested by the ASTM test D-1160.

13. A method of treating bodies of uncemented sands, soils and aggregates to consolidate the same, which comprises applying to the surface of said bodies a solution consisting essentially of a light petroleum oil fraction having a boiling point lower than that of light gas oil and from 10 to 30 percent by weight of gel type asphalt, said gel type asphalt having a penetration of 60–100 at 77° F. (ASTM D–5), and having an R ratio of from about 0.8 to about 1.2, said solution containing a cationic surfactant and said solution having a 95% minimum coating retention as tested by ASTM test D–1664 at the rate of about 0.2 to about 1 gallon per square yard of said surface, and thereafter applying to said surface a solution containing 50–70 percent by weight of said asphalt in said light petroleum oil containing said cationic surfactant, said solution having a 95% minimum coating retention by said ASTM test D–1664, said last solution being applied at the rate of from about 0.5 to about 2.0 gallons per square yard of said surface, said R ratio being equal to the ratio $$\frac{N+A_1}{P+A_2}$$

wherein N, $A_1$, $A_2$ and P are respectively the percent by weight of nitrogen bases, first acidaffins, second acidaffins, and paraffins present in said asphalt.

14. The method of claim 13 in which said asphalt is a blend of a roofing grade asphalt having from about 10 to about 30 penetration at 77° F. (ASTM D–5) and a petroleum fraction substantially free of asphaltenes and having a boiling point substantially higher than that of said light petroleum fraction.

15. The method of claim 13, in which said light petroleum oil fraction has an initial boiling point of 300–350° F. and 90% distilled below 450° F. at 760 mm. Hg pressure.

16. The method of claim 14, in which said light petroleum oil fraction has a boiling point of 300–350° F. and 90% distilled below 450° F. at 760 mm. Hg pressure, and said petroleum fraction substantially free of asphaltenes is substantially free of fractions boiling below about 160° C. at 10 mm. Hg pressure when tested by the ASTM test D-1160.

References Cited

UNITED STATES PATENTS

| | | | |
|---|---|---|---|
| 2,332,311 | 10/1943 | Fadden | 106—277 |
| 2,639,651 | 5/1953 | Scott | 94—23 |
| 2,646,361 | 7/1953 | Rostler | 94—22X |
| 2,704,967 | 3/1955 | Rostler | 106—277X |
| 2,760,878 | 8/1956 | Lhorty | 106—277X |
| 3,008,843 | 11/1961 | Jolly | 106—285X |
| 3,050,468 | 8/1962 | Wright | 106—277 |
| 3,126,350 | 3/1964 | Borgfeldt | 106—277X |
| 3,162,101 | 12/1964 | Rostler | 94—23 |
| 3,344,056 | 9/1967 | Rostler | 94—23X |
| 2,759,839 | 8/1956 | Crews et al. | 106—273N |
| 2,906,635 | 9/1959 | Teot | 106—273N |
| 2,919,204 | 12/1959 | Dybalski et al. | 106—273NX |
| 3,046,149 | 7/1962 | Moore et al. | 106—273N |
| 3,114,649 | 12/1963 | Katz | 106—273N |
| 3,432,321 | 3/1969 | Rostler | 106—285 |

JULIUS FROME, Primary Examiner

J. B. EVANS, Assistant Examiner